(12) United States Patent
Alger et al.

(10) Patent No.: US 11,028,928 B2
(45) Date of Patent: Jun. 8, 2021

(54) INTERFLOW LIMITING VALVE ASSEMBLY

(71) Applicant: Roller Bearing Company of America, Inc., Oxford, CT (US)

(72) Inventors: Mark Alger, Oro Valley, AZ (US); David Lynde, Dayton, OH (US); Brandon Brown, Tucson, AZ (US); Jeremy Ulliman, Tucson, AZ (US)

(73) Assignee: Roller Bearing Company of America, Inc., Oxford, CT (US)

( * ) Notice: Subject to any disclaimer, the term of this patent is extended or adjusted under 35 U.S.C. 154(b) by 144 days.

(21) Appl. No.: 16/375,258

(22) Filed: Apr. 4, 2019

(65) Prior Publication Data

US 2019/0309860 A1    Oct. 10, 2019

Related U.S. Application Data

(60) Provisional application No. 62/653,747, filed on Apr. 6, 2018.

(51) Int. Cl.
| | |
|---|---|
| *F16K 3/26* | (2006.01) |
| *F16K 5/02* | (2006.01) |
| *F16L 15/00* | (2006.01) |
| *F16K 11/02* | (2006.01) |
| *F16K 3/24* | (2006.01) |

(52) U.S. Cl.
CPC ............ *F16K 3/265* (2013.01); *F16K 5/0235* (2013.01); *F16L 15/009* (2013.01); *F16K 3/246* (2013.01); *F16K 11/02* (2013.01)

(58) Field of Classification Search
CPC ........ F16K 3/265; F16K 5/0235; F16K 11/02; F16K 3/246; F16L 15/009
See application file for complete search history.

(56) References Cited

U.S. PATENT DOCUMENTS 2,852,039 A * 9/1958 Dotter .................... F16K 11/02
                                                         251/31
3,086,622 A    4/1963 Schultze
(Continued)

FOREIGN PATENT DOCUMENTS

| CN | 2564754 Y | 8/2003 |
|---|---|---|
| CN | 203685740 U | 7/2014 |

(Continued)

*Primary Examiner* — Matthew W Jellett
*Assistant Examiner* — Christopher D Ballman
(74) *Attorney, Agent, or Firm* — Murtha Cullina LLP

(57) ABSTRACT

A sleeve for a valve assembly has an inside surface having an interior area and a first cylindrical section extending from a first axial end and a second cylindrical section located between the first cylindrical section and second axial end. A conical interior seating surface extends between the first and second cylindrical sections. The conical interior seating surface is metallic. The sleeve includes a groove that extends circumferentially around and radially outward in the first cylindrical section. The groove extends axially away from the conical interior seating surface towards the first axial end. The sleeve has one or more ports extending radially through the first cylindrical section proximate the groove and are spaced apart from the groove by a lip formed by the first cylindrical section. The lip extends a predetermined axial distance between the groove and the port. The lip extends around the first cylindrical section and radially inward.

21 Claims, 8 Drawing Sheets

(56) References Cited

U.S. PATENT DOCUMENTS

| | | | | |
|---|---|---|---|---|
| 3,270,622 | A * | 9/1966 | Stephens | F15B 13/02 91/186 |
| 3,331,393 | A * | 7/1967 | Ernyei | F16K 11/02 137/599.07 |
| 3,349,801 | A * | 10/1967 | Grundmann | F16K 11/02 137/627.5 |
| 3,469,591 | A * | 9/1969 | Odendahl | F16K 47/06 137/14 |
| 3,756,260 | A * | 9/1973 | Fredd | F16K 3/0254 137/1 |
| 3,921,660 | A | 11/1975 | Kowalski | |
| 4,011,892 | A | 3/1977 | Kowalski | |
| 4,099,541 | A | 7/1978 | Binkley et al. | |
| 4,193,422 | A * | 3/1980 | Rider | F16K 11/02 137/625.49 |
| 4,466,461 | A * | 8/1984 | Weiss | F16K 3/34 137/625.3 |
| 4,846,216 | A * | 7/1989 | Raymond | F16K 3/246 137/516.27 |
| 5,113,908 | A * | 5/1992 | Steinke | F16K 47/04 137/625.3 |
| 6,158,716 | A | 12/2000 | Wilkins et al. | |
| 6,536,472 | B2 * | 3/2003 | Baumann | F16K 39/022 137/625.3 |
| 6,539,976 | B1 | 4/2003 | Whiteside | |
| 6,951,317 | B2 | 10/2005 | Woessner et al. | |
| 7,357,151 | B2 * | 4/2008 | Lonnes | F16K 3/265 137/509 |
| 8,490,702 | B2 * | 7/2013 | Stromquist | E21B 43/26 166/298 |
| 8,757,268 | B2 * | 6/2014 | LeJeune | F16K 15/063 166/325 |
| 8,798,304 | B2 * | 8/2014 | Miller | H04R 25/402 381/356 |
| 9,719,600 | B2 | 8/2017 | Patterson | |
| 10,605,110 | B2 * | 3/2020 | Passino, Jr. | F01D 17/105 |
| 2003/0131889 | A1 * | 7/2003 | Kim | G05D 16/106 137/491 |
| 2010/0147403 | A1 | 6/2010 | Bresnahan | |
| 2011/0291034 | A1 * | 12/2011 | Bunge | F16K 3/246 251/12 |
| 2017/0051676 | A1 * | 2/2017 | Geiger | F16K 3/246 |
| 2017/0211710 | A1 | 7/2017 | Patterson | |
| 2018/0180225 | A1 | 6/2018 | Despres | |
| 2018/0231135 | A1 | 8/2018 | Matteucci | |

FOREIGN PATENT DOCUMENTS

| | | |
|---|---|---|
| CN | 106838377 A | 6/2019 |
| GB | 695656 | 8/1953 |
| JP | 2505353 B2 | 6/1996 |
| KR | 1020190010930 A | 2/2019 |
| RU | 2319881 C1 | 3/2008 |

* cited by examiner

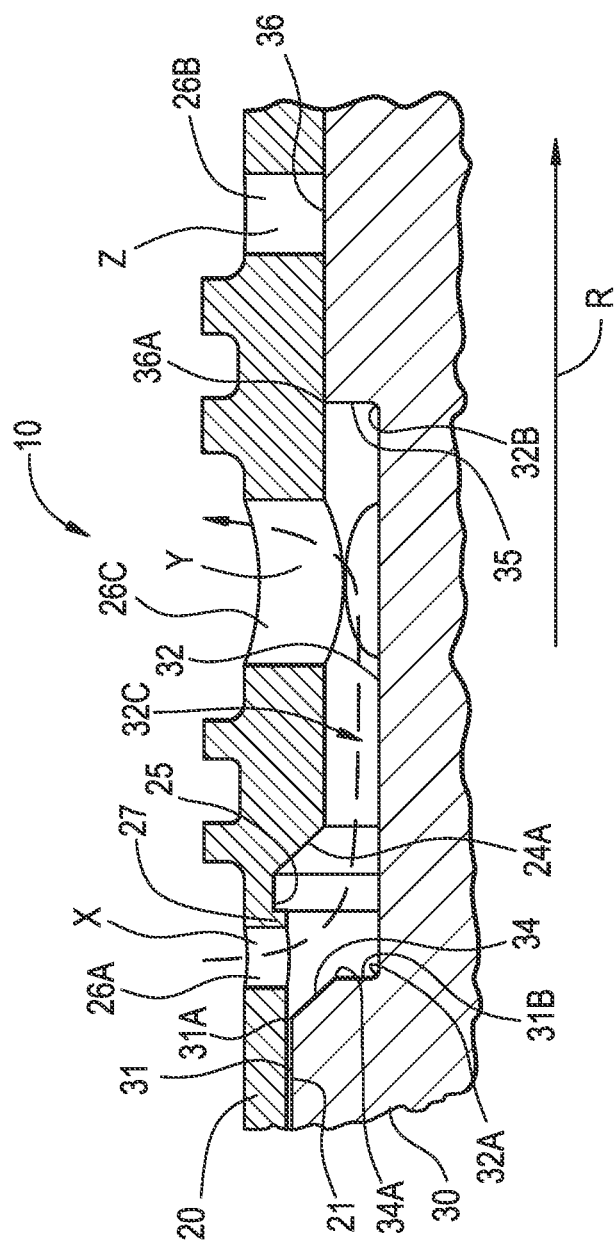

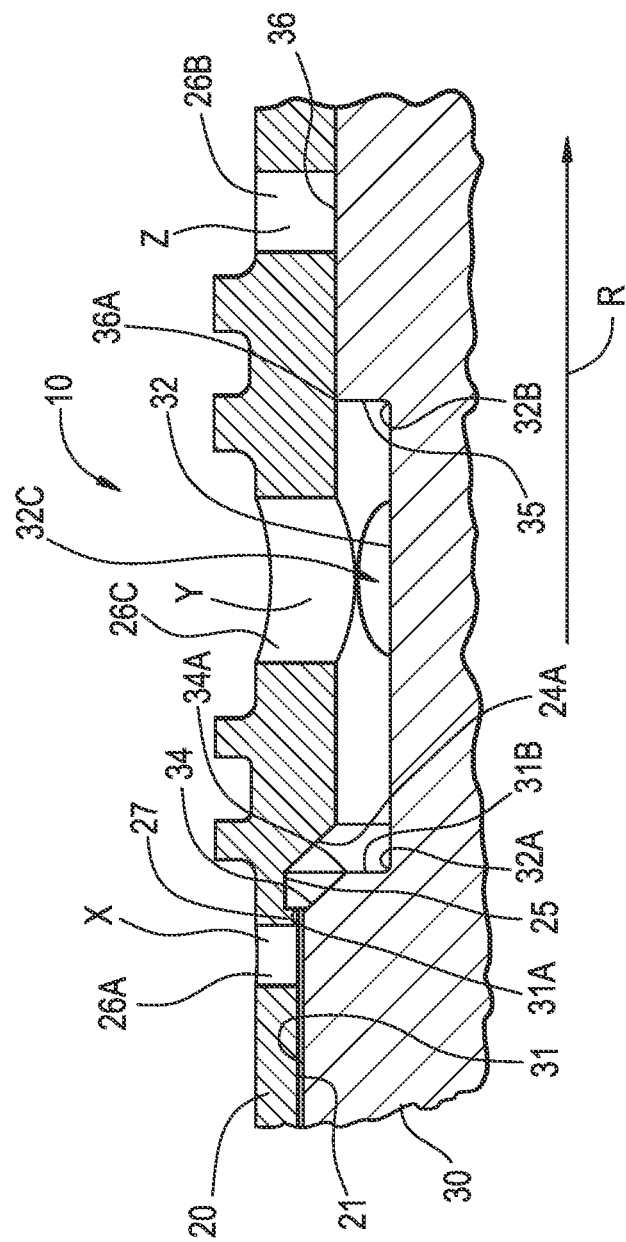

INTERFLOW LIMITING VALVE ASSEMBLY

CROSS REFERENCE TO RELATED APPLICATION

The instant application is a non-provisional of, and claims priority benefit to provisional patent application No. 62/653,747, entitled, "Interflow Limiting Valve Assembly," filed Apr. 6, 2018, the entirety of which is incorporated by reference herein.

FIELD OF THE INVENTION

The present invention relates generally to an interflow limiting valve assembly and more particularly to a sleeve having an angled metallic interior seating surface that engages an angled metallic exterior seating surface of a plug slidingly disposed in the sleeve and a radially extending lip that defines a small gap between the lip and an exterior surface of the plug to limit interflow of fluids over the lip and through the gap.

BACKGROUND OF THE INVENTION

Valves are employed in many applications for controlling flow of fluids such as gases, liquids (e.g., hydraulic fluids), steam and slurries. The valves are of many different configurations including gate valves, throttling valves, shut off valves, check valves and relief valves. Some valves include a plurality of ports and internal components with one or more predetermined flow paths. Often, it is required to tightly shut off one or more flow paths to prevent internal or external valve leakage and undesirable interflow within the valve.

Some valve seats are soft to provide a positive and flexible sealing surface. However, soft valve seats are easily damaged and are known to leak. In addition, when controlling flow between an open and closed position, internal valve components such as valve plugs and poppets must slide easily and freely within the body of the valve. To accomplish such free movement, tightly controlled tolerances and gaps between the valve components are created. As the gaps are increased, interflow or internal leakage within the valve may occur.

During transient conditions, it is important for any valve to control the interflow timing of open/closed flow paths. Failure to properly and adequately control opening/closing of flow paths can result in undesirable pressure spikes, water-hammer effects, or unintended pressurization of separate features or components.

Thus, there is a need for an improved valve assembly that prevents interflow within the valve and provides leak tight shut-off capability.

SUMMARY

There is disclosed herein, a sleeve for a valve assembly. The sleeve includes an annular body that has an inside surface extending from a first axial end to a second axial end of the sleeve. The inside surface defines an interior area and has a first cylindrical section extending from the first axial end and a second cylindrical section located between the first cylindrical section and the second axial end. A conical interior seating surface extends between the first cylindrical section and the second cylindrical section. The conical interior seating surface is metallic. The sleeve includes a groove that extends circumferentially around and radially outward in the first cylindrical section. The groove extends axially away from the conical interior seating surface towards the first axial end. A plurality of ports extend radially through the first cylindrical section of the inside surface proximate the groove. The plurality of ports includes one or more first ports (e.g., a supply ports) that are spaced apart from the groove by a lip formed by the first cylindrical section. The lip extends a predetermined axial distance between the groove and the first port. The lip extends circumferentially around the first cylindrical section and radially inward from the first cylindrical section.

In one embodiment, the conical interior seating surface defines a first angle (e.g., 45 degrees) relative to a radial line oriented perpendicular to a longitudinal axis of the sleeve.

In one embodiment, the groove extends radially outward from the inside surface about 0.02 inches to about 0.03 inches, to provide space for forming the conical interior seating surface.

There is further disclosed herein a valve assembly that includes a sleeve and a plug therein. The sleeve includes an annular body that has an inside surface extending from a first axial end to a second axial end of the sleeve. The inside surface defines an interior area and the inside surface has a first cylindrical section extending from the first axial end and a second cylindrical section located between the first axial end and the second axial end. A conical interior seating surface extends between the first cylindrical section and the second cylindrical section. The conical interior seating surface is metallic. The sleeve includes a groove that extends circumferentially around and radially outward in the first cylindrical section. The groove extends axially away from the conical interior seating surface towards the first axial end. A plurality of ports extend radially through the first cylindrical section of the inside surface proximate the groove. The plurality of ports includes one or more first ports (e.g., a supply ports). The first ports are spaced apart from the groove by a lip formed by the first cylindrical section. The lip extends a predetermined axial distance between the groove and the first port. The lip extends circumferentially around the first cylindrical section and radially inward from the first cylindrical section. The valve assembly includes an annular plug disposed in the interior area of the sleeve. The plug has an exterior surface that extends from a third axial end to a fourth axial end of the plug. The conical exterior seating surface extends axially inward from the fourth axial end of the plug. The conical exterior seating surface is metallic. A portion of the exterior surface of the plug slidingly engages a portion of the inside surface of the annular body. The plug defines a closed position wherein the conical exterior seating surface sealingly engages the conical interior seating surface. The lip is in sealing proximity to a portion of the exterior surface of the plug, thereby forming a barrier to the axial flow of fluids across the lip.

In one embodiment, the conical interior seating surface defines a first angle (e.g., about 45 degrees) relative to a radial line oriented perpendicular to a longitudinal axis of the sleeve.

In one embodiment, the conical exterior seating surface defines a second angle (e.g., about 47 degrees) relative to a longitudinal axis of the plug.

In one embodiment, the groove extends radially outward from the inside surface about 0.02 inches to about 0.03 inches, to provide space for forming the conical interior seating surface.

In one embodiment, the lip and the exterior surface of the plug are spaced apart by a gap of about 0.002 inches to about 0.005 inches.

In one embodiment, the plurality of ports further includes one or more second ports (e.g., return ports).

In one embodiment, during axial transition of the plug relative to the sleeve the exterior surface of the plug slidingly engages with the interior surface of the sleeve to cover the first port.

In one embodiment, when the exterior surface of the plug covers the first port, a portion of the second port is covered by the exterior surface of the plug.

DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein:

FIG. 7A is an enlarged view of detail 7 in the valve assembly of FIG. 2 with the plug uncovering a first port, covering a second port and creating a flow path between the first port and a third port located between the first port and the second port;

FIG. 7B is an enlarged view of detail 7 in the valve assembly of FIG. 2 with the plug covering the first port and second port thereby blocking flow between the first, second and third ports.

DETAILED DESCRIPTION

Figure 1:
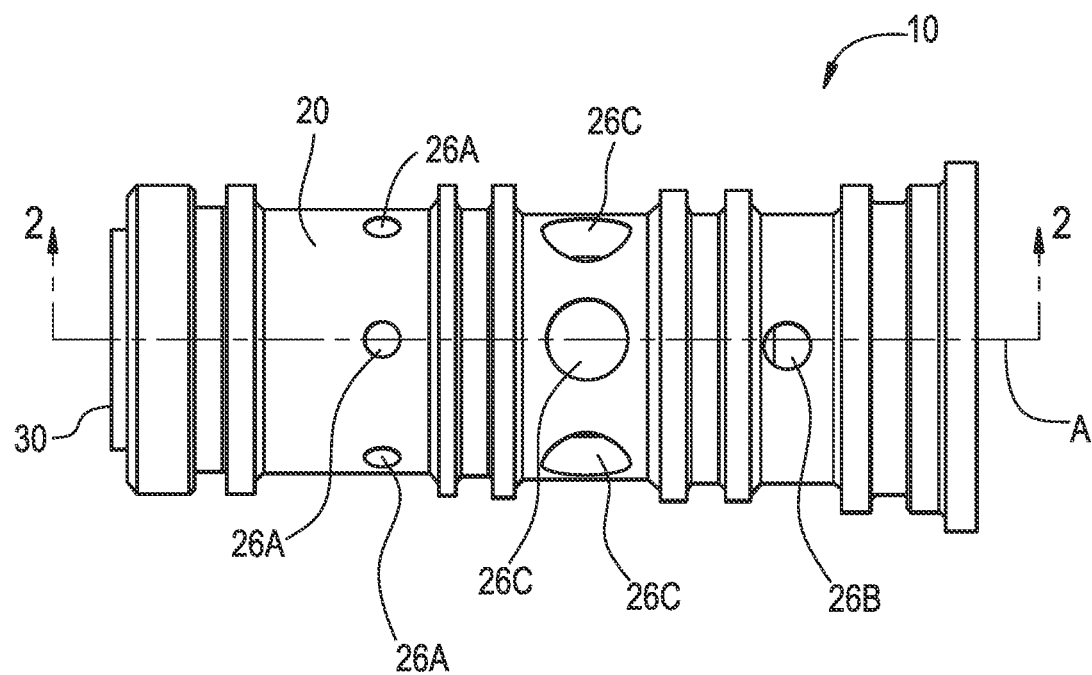
FIG. 1 is a front view of the valve assembly of the present invention.
Figure 2:
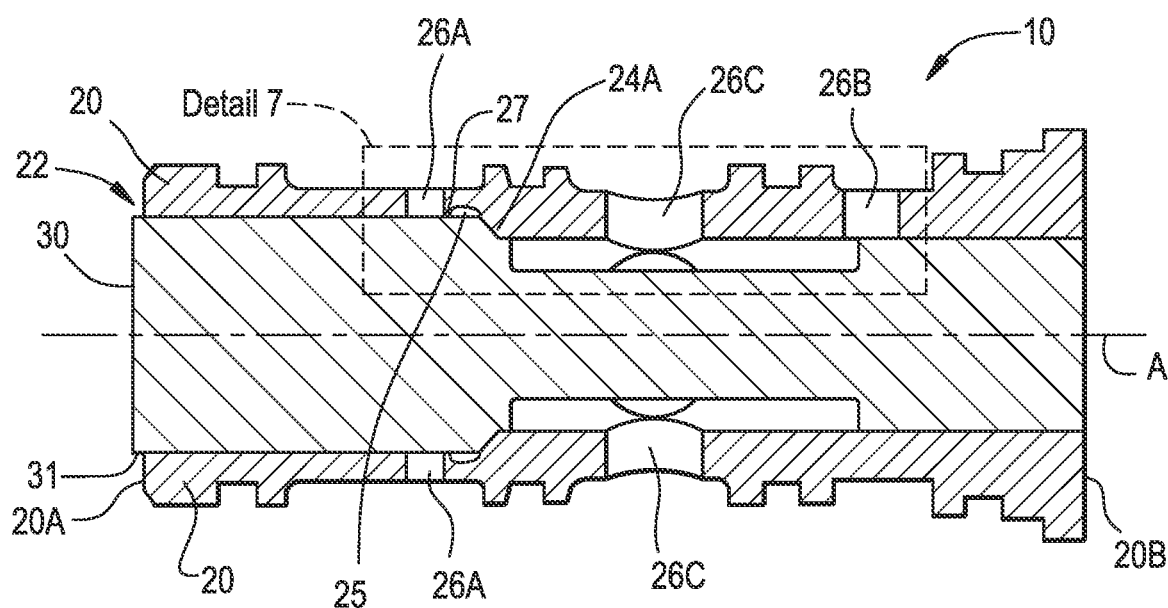
FIG. 2 is a cross sectional view of the valve assembly of FIG. 1, taken across section 2-2.

As shown in FIGS. 1 and 2, a valve assembly of the present invention is generally designated by the numeral 10. The valve assembly 10 includes a sleeve 20 (e.g., annular body) and a plug 30 disposed in an interior area 22 (see FIG. 2) of the sleeve 20. The plug 30 is configured to slide in the interior of the sleeve 20 to control flow of fluid through the valve assembly 10.

Figure 3:
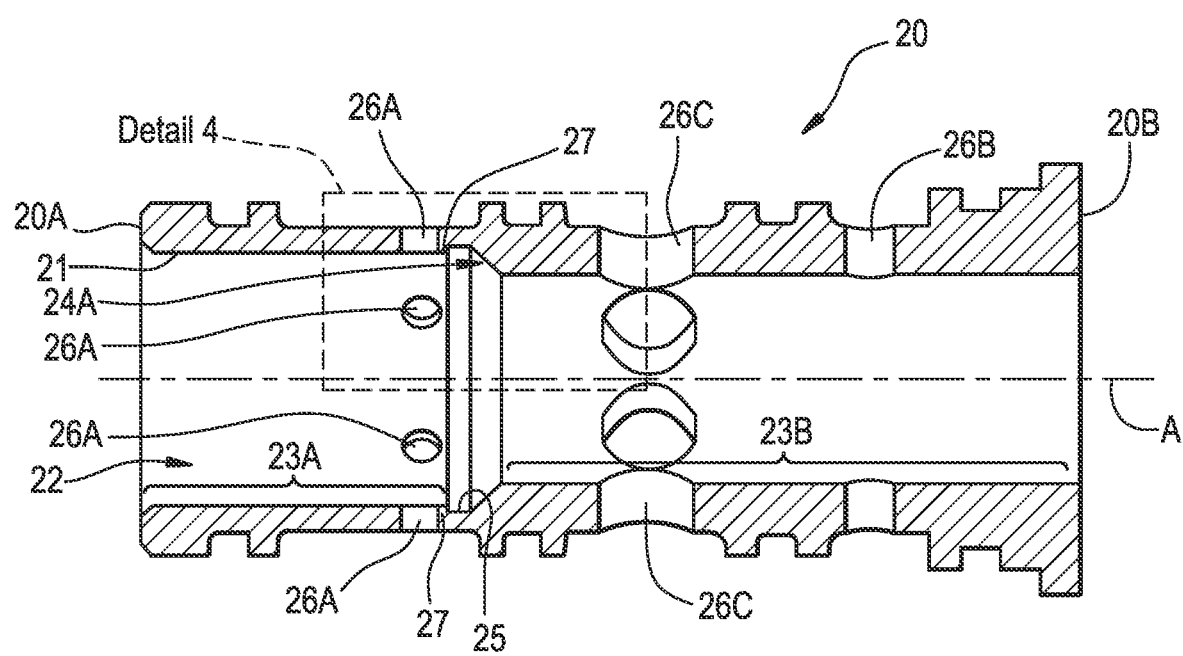
FIG. 3 is a cross sectional view of a sleeve portion of the valve assembly of FIG. 1, taken across section 2-2.
Figure 4:
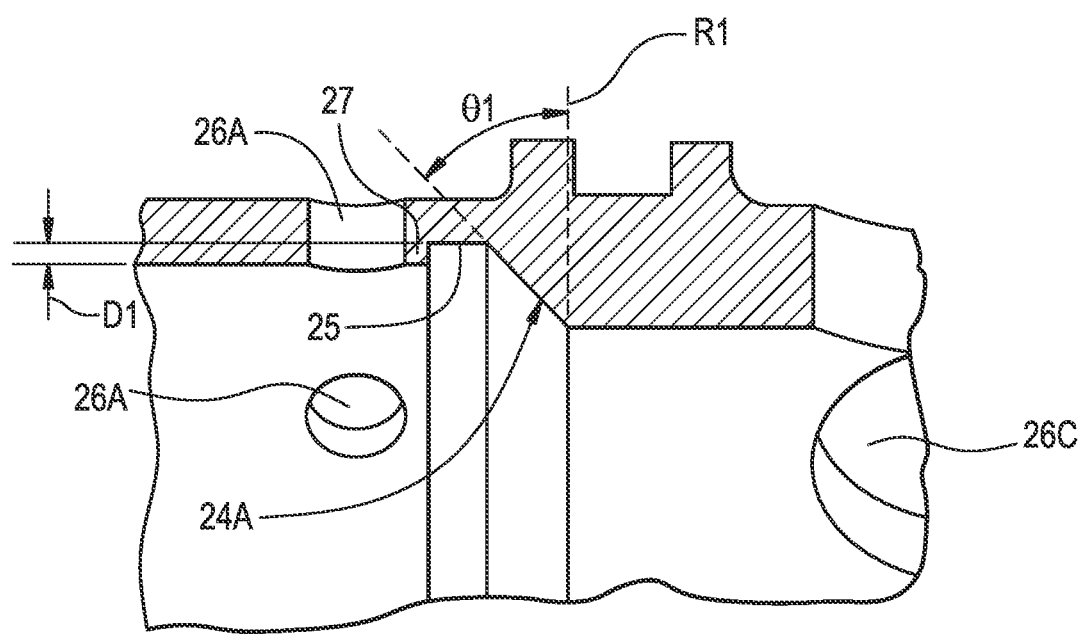
FIG. 4 is an enlarged view of detail 4 of the sleeve illustrated in FIG. 3.

As shown in FIG. 3, the sleeve 20 is configured as an annular body that has an inside surface 21 extending from a first axial end 20A to a second axial end 20B of the sleeve 20. The inside surface 21 defines the interior area 22. The inside surface 21 has a first cylindrical section 23A extending axially inward from the first axial end 20A and a second cylindrical section 23B located between the first cylindrical section 23A and the second axial end 20B. The sleeve 20 includes a first conical interior seating surface 24A extending between the first cylindrical section 23A and the second cylindrical section 23B. As shown in FIGS. 3 and 4, a first conical seating surface 24A defines a first angle θ1 relative to a radial line R1 oriented perpendicular to a longitudinal axis A of the sleeve 20. In one embodiment, the first angle θ1 is about 45 degrees (+/−1°).

The first conical interior seating surface 24A is made from a metallic material such as an austenitic or ferritic stainless steel or a copper based alloy such as a bronze. In one embodiment, the entire sleeve 20 is manufactured from a metallic material such as an austenitic or ferritic stainless steel or a copper based alloy such as a bronze.

As shown in FIGS. 3-4, the sleeve 20 includes a groove 25 that extends circumferentially entirely around and radially outward in the first cylindrical section 23A. The groove 25 extends axially away from the first conical interior seating surface 24A towards the first axial end 20A. In one embodiment, the groove 25 extends radially outward from the inside surface 21 a radial distance D1 about 0.02 inches to about 0.03 inches, to provide space for forming (e.g., machining) the first conical interior seating surface 24A.

Figure 7C:
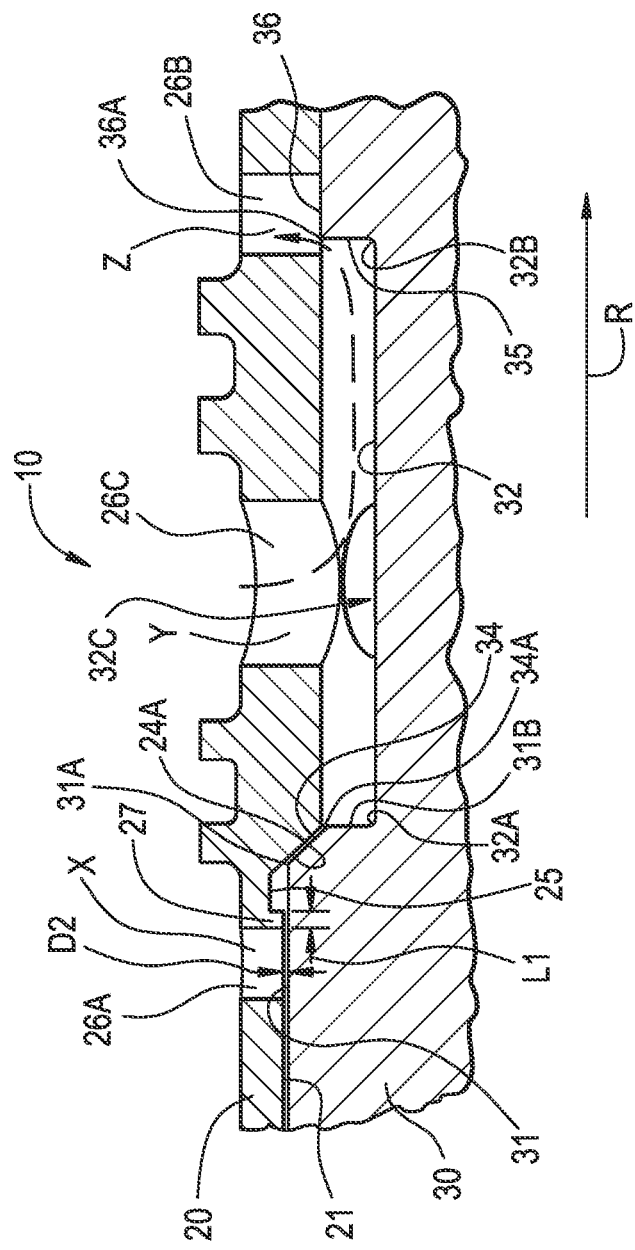
FIG. 7C is an enlarged view of detail 7 in the valve assembly of FIG. 2 with the plug covering the first port and partially uncovering the second port and creating a flow path between the third port and the second port.

As shown collectively in FIGS. 1-4, the sleeve 20 includes a plurality of ports that extend radially through the sleeve 20. As best shown in FIG. 3, the plurality of ports includes at least one first port 26A (e.g., a "supply port") that extends radially through the first cylindrical section 23A of the inside surface 21 proximate the groove 25. Reference to "supply ports" is not meant to be restrictive to the flow of fluids, as it is contemplated that any port can provide a supply and/or a return of fluids. As shown in FIGS. 7A-7C, the plurality of first ports 26A are at position X.

The first ports 26A are spaced apart from the groove 25 by a lip 27 formed by the first cylindrical section 23A of the inside surface 21. As best shown in FIG. 7C, the lip 27 extends axially a predetermined axial distance L1 between the groove 25 and the first ports 26A. The lip 27 extends circumferentially around the first cylindrical surface and extends radially inward from the first cylindrical section 23A of the inside surface 21. The lip 27 and a first plug surface section 31 of the exterior surface 30E of the plug 30 are spaced apart from one another by a gap D2 of about 0.002 inches to about 0.005 inches. The gap D2 is configured to prevent or limit flow of fluids (e.g., hydraulic fluids) over the lip 27 and through the gap D2.

As shown in FIG. 3, the plurality of ports also includes at least one second port 26B (e.g., a "return port") that extend radially through the second cylindrical section 23B. Reference to "return ports" is not meant to be restrictive to the flow of fluids, as it is contemplated that any port can provide a supply and/or a return of fluids.

As shown in FIGS. 7A-7C, the second port 26B is in position Z, which is axially to the right of the first ports 26A in the direction of the arrow R. For example, the second port 26B is axially downstream of the first port 26A relative to the flow of fluids through the valve assembly 10. As shown in FIG. 2, the annular plug 30 is disposed in the interior area 22 of the sleeve 20.

Figure 5:
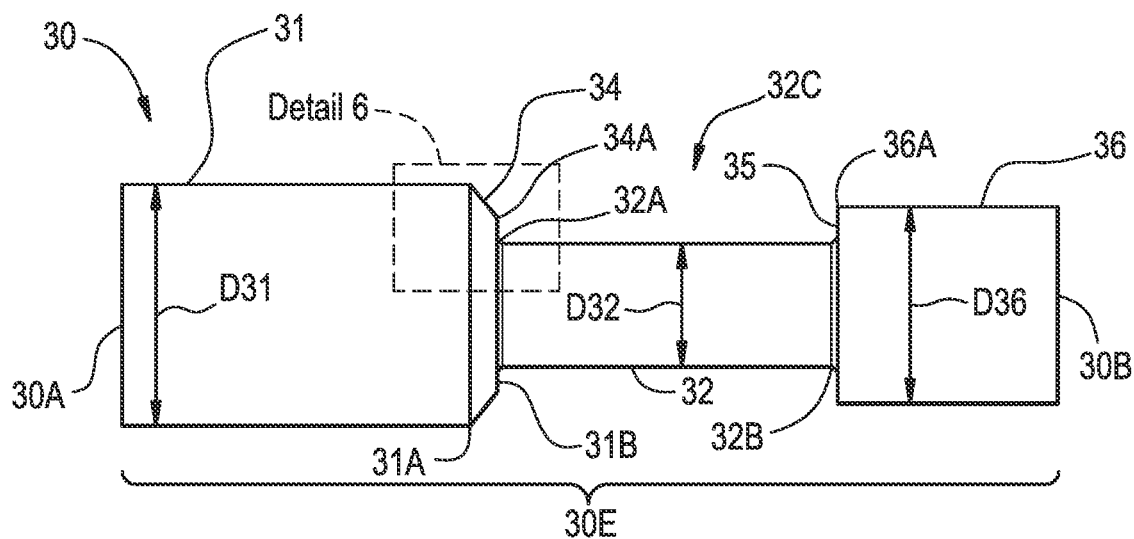
FIG. 5 is a front view of the plug of the present invention.

As shown in FIG. 5, the plug 30 has an exterior surface 30E that extends from a first axial plug-end 30A to a second axial plug-end 30B of the plug 30. The exterior surface 30E of the plug 30 has a stepped configuration. The exterior surface 30E of the plug 30 includes the first plug surface section 31 which extends axially from the first plug-end 30A to an axial facing transition plane 31A. The first plug surface section 31 is cylindrical. A conical exterior seating surface 34 extends from the first plug surface section 31 and tapers axially towards the second axial plug-end 30B and radially inward from the fourth axial end 30B first plug surface section 31 of the plug 30. The conical exterior seating surface 34 terminates at a first radially outermost circumferential edge 34A of a first axial shoulder 31B. The first axial shoulder 31B faces towards the second axial plug-end 30B.

As shown in FIG. 5, the exterior surface 30E of the plug 30 has a second plug surface section 32 that extends axially from a first radially innermost portion 32A of the first axial shoulder 31B towards the second axial plug-end 30B and terminates at a second radially innermost portion 32B of a second axial shoulder 35. The second plug surface section 32 is cylindrical. The second axial shoulder 35 faces towards the first axial shoulder 31B. The second axial shoulder 35 terminates at a radially outermost edge 36A thereof.

As shown in FIG. 5, the exterior surface 30E of the plug 30 has a third plug surface section 36 that extends axially from the radially outermost edge 36A of the second axially shoulder 35 towards and terminating at the second axial plug-end 30B. The third plug surface section 36 is cylindrical. The first plug surface section 31 has the first outside plug diameter D31. The second plug surface section 32 has a second outside plug diameter D32. The third plug surface section 36 has a third outside plug diameter D36. The first outside plug diameter D31 is greater than the second outside plug diameter D32 and is greater than the third outside plug diameter D36. The second outside plug diameter D32 is less than the first plug outside diameter D31 and is less than the third outside plug diameter D36. An annular channel 32C is defined between the first axial shoulder 31B and the second axial shoulder 35 and along the second plug surface section 32.

Figure 6:
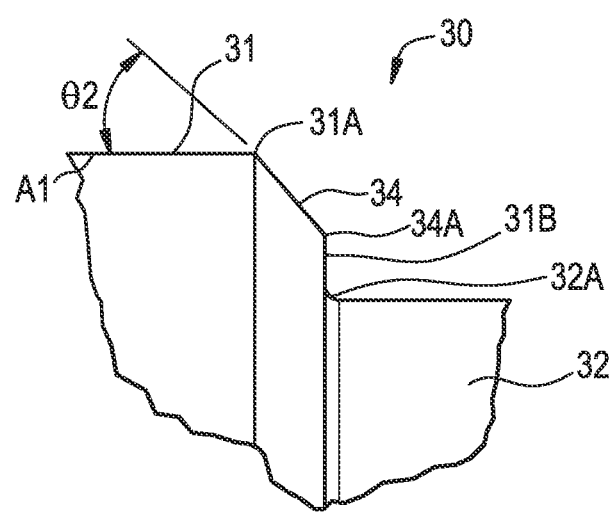
FIG. 6 is an enlarged view of detail 6 of a portion of the plug illustrated in FIG. 5.

As shown in FIG. 6, the conical exterior seating surface 34 defines an angle θ2 relative to a reference line A1 that is parallel to the longitudinal axis A. In one embodiment, the angle θ2 is about 47 degrees, +/−1°. The conical exterior seating surface 34 is made from a metallic material such as an austenitic or ferritic stainless steel or a copper based alloy such as a bronze. In one embodiment, the entire plug 30 is manufactured from a metallic material such as an austenitic or ferritic stainless steel or a copper based alloy such as a bronze.

As shown in FIGS. 2 and 7A-7C, a portion of the exterior surface 30E of the plug 30 slidingly engages a portion of the inside surface 21 of the annular body 20. As shown best in FIG. 7C, the plug 30 defines a closed position from a supply flow, wherein the conical exterior seating surface 34 sealingly engages the first conical interior seating surface 24A. The lip 27 is in sealing proximity to a portion of the exterior surface 30E of the plug 30 thereby forming a barrier to the axial flow of fluids from the supply flow across the lip 27. As shown in FIG. 7C, fluid can flow from the third port 26C at position Y to the second port 26B at position Z when the plug 30 is static and in the closed position.

FIGS. 7A and 7B illustrate the transition of the plug 30 moving axially to the right relative to the sleeve 20 (shown by arrow R). As shown in FIG. 7A, during axial transition of the plug 30 moving along direction R, the exterior surface 30E of the plug 30 fully covers second port 26B at position Z of the sleeve 20 while leaving the first port 26A at position X uncovered. As shown in FIG. 7A, this creates a flow path from the first port 26A at position X to the third port 26C at position Y.

FIG. 7B illustrates a position of the plug 30 as it has moved further axially in direction R. The conical exterior surface 34 has moved past the first port 26A at position X, thereby causing the first plug surface section 31 of the exterior surface 30E of plug 30 to fully cover the first port 26A at position X. In FIG. 7B, while the first port 26A at position X is fully covered, the third plug surface section 36 of the exterior surface 30E of the plug 30 fully covers the second port 26B at position Z The position of the plug 30 in FIG. 7B cuts off the supply flow of fluid between the first port 26A at position X and the second port 26B at position Z.

Continued movement of the plug 30 in the direction R results in the closed position as shown in FIG. 7C wherein the conical exterior surface 34 of the plug 30 is seated on the conical interior seating surface 24A of the sleeve 20 and the second port 26B at position Z has been at least partially uncovered by the third plug surface section 36 of the plug 30, i.e. the second axial shoulder 35 of the plug 30 has moved further axially in direction R such that the third plug surface section 36 of the plug 30 is no longer fully covering the second port 26B at position Z. This creates a flow path from the third port 26C at position Y to the second port 26B at position Z.

Although the present invention has been disclosed and described with reference to certain embodiments thereof, it should be noted that other variations and modifications may be made, and it is intended that the following claims cover the variations and modifications within the true scope of the invention.

What is claimed is:

1. A sleeve for a valve assembly, the sleeve comprising:
an annular body having an inside surface extending from a first axial end to a second axial end of the sleeve, the inside surface defining an interior area, the inside surface having a first cylindrical section extending from the first axial end and a second cylindrical section located between the first cylindrical section and the second axial end, a conical interior seating surface extending between the first cylindrical section and the second cylindrical section, the conical interior seating surface being metallic;
a groove extending circumferentially around and radially outward in the first cylindrical section, the groove extending axially away from the conical interior seating surface towards the first axial end;
at least one first port extending radially through the first cylindrical section of the inside surface proximate the groove, the at least one first port being spaced apart from the groove by a lip formed by the first cylindrical section, the lip extending a predetermined axial distance between the groove and the at least one first port, and the lip extending circumferentially around the first cylindrical section and extending radially inward from the first cylindrical section; and
wherein the groove extends radially outward from the inside surface 0.02 inches to 0.03 inches, to provide space for forming the conical interior seating surface.

2. The sleeve according to claim 1, wherein the conical interior seating surface defines a first angle relative to a radial line oriented perpendicular to a longitudinal axis of the sleeve.

3. The sleeve according to claim 2, wherein the first angle is about 45 degrees.

4. A valve assembly comprising:
a sleeve comprising:
an annular body having an inside surface extending from a first axial end to a second axial end of the sleeve, the inside surface defining an interior area, the inside surface having a first cylindrical section extending from the first axial end and a second cylindrical section located between the first cylindrical section and the second axial end, a conical interior seating surface extending between the first cylindrical section and the second cylindrical section, the conical interior seating surface being metallic;

a groove extending circumferentially around and radially outward in the first cylindrical section, the groove extending axially away from the conical interior seating surface towards the first axial end;

at least one first port extending radially through the first cylindrical section of the inside surface proximate the groove, the at least one first port being spaced apart from the groove by a lip formed by the first cylindrical section, the lip extending a predetermined axial distance between the groove and the at least one first port, and the lip extending circumferentially around the first cylindrical section and extending radially inward from the first cylindrical section;

an annular plug disposed in the interior area of the sleeve, the plug comprising an exterior surface extending from a third axial end to a fourth axial end of the plug, a conical exterior seating surface extending axially inward from the fourth axial end of the plug, the conical exterior seating surface being metallic;

at least a portion of the exterior surface of the plug slidingly engaging at least a portion of the inside surface of the annular body, and the plug defining a closed position wherein the conical exterior seating surface sealingly engages the conical interior seating surface;

the lip being in sealing proximity to at least a portion of the exterior surface of the plug thereby forming a barrier to the axial flow of fluids across the lip; and wherein the groove extends radially outward from the inside surface 0.02 inches to 0.03 inches, to provide space for forming the conical interior seating surface.

5. The valve assembly according to claim 4, wherein the conical interior seating surface defines a first angle relative to a radial line oriented perpendicular to a longitudinal axis of the sleeve.

6. The valve assembly according to claim 5, wherein the first angle is about 45 degrees.

7. The valve assembly according to claim 4, wherein the lip and the exterior surface of the plug are spaced apart by a gap of 0.002 inches to 0.005 inches.

8. The valve assembly of claim 4, wherein the conical exterior seating surface defines a second angle relative to a longitudinal axis of the plug.

9. The valve assembly of claim 8, wherein the second angle is about 47 degrees.

10. The valve assembly of claim 4, wherein, the sleeve further comprises at least one second port.

11. The valve assembly of claim 10, wherein during axial transition of the plug relative to the sleeve the exterior surface of the plug slidingly engages with the interior surface of the sleeve to cover the at least one first port.

12. The valve assembly of claim 11, wherein when the exterior surface of the plug covers the at least one first port, at least a portion of the at least one second port is covered by the exterior surface of the plug.

13. A valve assembly comprising:
a sleeve comprising:
an annular body having an inside surface extending from a first axial end to a second axial end of the sleeve, the inside surface defining an interior area, the inside surface having a first cylindrical section extending from the first axial end and a second cylindrical section located between the first cylindrical section and the second axial end, a conical interior seating surface extending between the first cylindrical section and the second cylindrical section, the conical interior seating surface being metallic;

a groove extending circumferentially around and radially outward in the first cylindrical section, the groove extending axially away from the conical interior seating surface towards the first axial end;

at least one first port extending radially through the first cylindrical section of the inside surface proximate the groove, the at least one first port being spaced apart from the groove by a lip formed by the first cylindrical section, the lip extending a predetermined axial distance between the groove and the at least one first port, and the lip extending circumferentially around the first cylindrical section and extending radially inward from the first cylindrical section;

an annular plug disposed in the interior area of the sleeve, the plug comprising an exterior surface extending from a third axial end to a fourth axial end of the plug, a conical exterior seating surface extending axially inward from the fourth axial end of the plug, the conical exterior seating surface being metallic;

at least a portion of the exterior surface of the plug slidingly engaging at least a portion of the inside surface of the annular body, and the plug defining a closed position wherein the conical exterior seating surface sealingly engages the conical interior seating surface;

the lip being in sealing proximity to at least a portion of the exterior surface of the plug thereby forming a barrier to the axial flow of fluids across the lip; and wherein the lip and the exterior surface of the plug are spaced apart by a gap of 0.002 inches to 0.005 inches.

14. The valve assembly according to claim 13, wherein the conical interior seating surface defines a first angle relative to a radial line oriented perpendicular to a longitudinal axis of the sleeve.

15. The valve assembly according to claim 14, wherein the first angle is about 45 degrees.

16. The valve assembly according to claim 13, wherein the groove extends radially outward from the inside surface 0.02 inches to 0.03 inches, to provide space for forming the conical interior seating surface.

17. The valve assembly of claim 13, wherein the conical exterior seating surface defines a second angle relative to a longitudinal axis of the plug.

18. The valve assembly of claim 17, wherein the second angle is about 47 degrees.

19. The valve assembly of claim 13, wherein the sleeve further comprises at least one second port.

20. The valve assembly of claim 19, wherein during axial transition of the plug relative to the sleeve the exterior surface of the plug slidingly engages with the interior surface of the sleeve to cover the at least one first port.

21. The valve assembly of claim 20, wherein when the exterior surface of the plug covers the at least one first port, at least a portion of the at least one second port is covered by the exterior surface of the plug.

* * * * *